United States Patent [19]
Görisch

[11] Patent Number: 4,606,547
[45] Date of Patent: Aug. 19, 1986

[54] COMPOSITE MACHINE HOUSING AND SEALS THEREFOR

[75] Inventor: Armin Görisch, Offstein, Fed. Rep. of Germany

[73] Assignee: Klein, Schanzlin & Becker Aktiengesellschaft, Frankenthal, Fed. Rep. of Germany

[21] Appl. No.: 706,126

[22] Filed: Feb. 27, 1985

[30] Foreign Application Priority Data

Mar. 3, 1984 [DE] Fed. Rep. of Germany ....... 3408011

[51] Int. Cl.$^4$ .......................... F16J 15/10; H02K 5/10
[52] U.S. Cl. .................................... 277/12; 277/167.5; 277/197; 277/199; 277/226; 277/230; 123/198 E; 310/89
[58] Field of Search ............... 277/6, 12, 167.5, 192, 277/197, 199, 214, 226, 230; 123/198 E; 310/89

[56] References Cited

U.S. PATENT DOCUMENTS

| | | | |
|---|---|---|---|
| 146,389 | 1/1874 | Fuller | 277/230 |
| 2,156,960 | 5/1939 | Baer | 123/198 E |
| 2,914,038 | 11/1959 | McKellar | 277/12 X |
| 3,379,444 | 4/1968 | Brummer et al. | 277/199 X |
| 3,386,746 | 6/1968 | Liebig | 277/199 X |
| 3,458,737 | 7/1969 | Lookman | 310/89 X |
| 3,661,197 | 5/1972 | Peterson | 277/226 X |
| 3,720,420 | 3/1973 | Jelinek et al. | 277/199 X |
| 4,029,294 | 6/1977 | McCaskill et al. | 277/167.5 X |
| 4,079,275 | 3/1978 | Fu | 310/89 X |
| 4,480,608 | 11/1984 | Valev | 123/198 E X |

FOREIGN PATENT DOCUMENTS

| | | | |
|---|---|---|---|
| 891479 | 9/1953 | Fed. Rep. of Germany | 277/226 |
| 774929 | 5/1957 | United Kingdom | 277/226 |
| 1057724 | 11/1983 | U.S.S.R. | 277/226 |

*Primary Examiner*—Robert S. Ward
*Attorney, Agent, or Firm*—Peter K. Kontler

[57] ABSTRACT

Two components of the housing of a centrifugal pump have adjoining surfaces and define an opening for an annular insert which surrounds a rotary shaft. The insert is surrounded by a sealing ring which is biased into sealing engagement with the peripheral surface of the insert and against the adjacent internal stops of the two components by a two-piece ring under the action of screws which mate with the insert and are caused to urge the two-piece ring against the sealing ring. The adjoining surfaces of the two components are grooved at the opposite sides of the insert and receive rope-like sealing members which are in sealing contact with the adjoining surfaces of the two components under the action of bolts which urge the two components toward each other. The sealing ring has recesses which sealingly receive the adjacent end portions of the sealing members.

19 Claims, 2 Drawing Figures

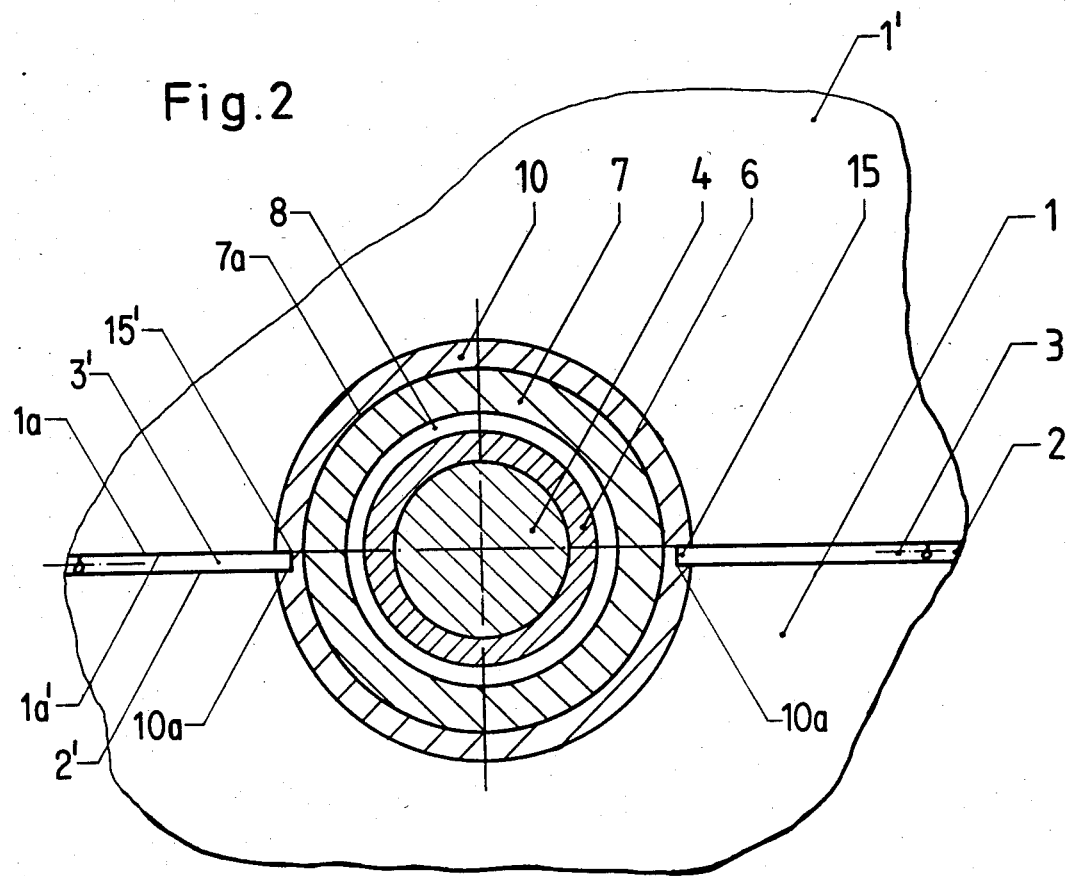

COMPOSITE MACHINE HOUSING AND SEALS THEREFOR

BACKGROUND OF THE INVENTION

The present invention relates to composite housings for machines or the like, and more particularly to improvements in seals or sealing assemblies for use in such housings. The invention also relates to improvements in composite housings which embody the seals.

French Pat. No. 10 94 274 discloses a composite housing for prime movers and/or processing machines wherein a shaft extends through an opening which is defined by two separable components of the housing and the adjoining surfaces of the two components are sealed by rope-like sealing members which are installed in the grooves of such surfaces. If the interior of the housing is to be maintained at a pressure exceeding that in the surrounding atmosphere, the housing must be adequately sealed not only between the two adjoining surfaces but also in the area around the shaft. The French patent further proposes the utilization of auxiliary devices serving to maintain the cord-like sealing members in adequate sealing engagement with the adjacent surfaces. However, the structure which is disclosed in the French patent fails to solve the problem of ensuring the establishment of an adequate seal in the area around the shaft, and especially in the regions where the end portions of the rope-like members are nearest to the shaft. The patent proposes to use additional rope-like sealing members which are inserted into grooves surrounding the shaft.

British Pat. No. 15 47 163 discloses a pipe branch which includes two substantially trough-shaped halves and specially designed two-piece sealing elements which are installed between the two halves. The sealing elements are deformed in the radial direction by the two halves and axially by pressure-applying rings so as to remain in sealing engagement with the pipe which carries the branch. It is necessary to provide specially designed sealing elements for each of a number of differently dimensioned branches. This contributes to the cost, especially storage cost, of such assemblies.

OBJECTS AND SUMMARY OF THE INVENTION

An object of the invention is to provide a novel and improved sealing assembly which can be used in composite housings of engines, motors, other prime movers, processing machines, machine tools, pumps, valves and/or many other machines.

Another object of the invention is to provide a composite housing which embodies the improved sealing assembly.

A further object of the invention is to provide a relatively simple, inexpensive and compact sealing assembly which is more reliable than heretofore known sealing assemblies.

An additional object of the invention is to provide novel and improved means for sealing a housing around the locus where a shaft or another rotary component extends from its interior.

Still another object of the invention is to provide a novel and improved method of assembling the composite housing and the sealing assembly.

A further object of the invention is to provide a novel and improved sealing ring for use in the above outlined sealing assembly.

Still another object of the invention is to provide a sealing assembly which occupies little room as considered in the axial direction of the shaft which is surrounded thereby.

One feature of the invention resides in the provision of a composite housing, particularly a machine housing, which comprises two neighboring components having adjoining surfaces (each of these components can constitute a metallic casting) at least one of which has a groove, an insert (e.g., an annular part) which is disposed in an opening defined by the two components and dividing each of the adjoining surfaces into first and second portions which flank the insert in the opening, a preferably one-piece and circumferentially complete sealing ring which surrounds the peripheral surface of the insert, substantially cordlike sealing means installed in the groove and sealingly contacting the other of the two adjoining surfaces as well as the sealing ring, and means for biasing the sealing ring into sealing engagement with the two components as well as with the peripheral surface of the insert. Thus, the sealing means establishes a seal between the adjoining surfaces of the two components while the sealing ring establishes a seal between the two components on the one hand and the insert on the other hand. The biasing means can comprise a second ring (which can be a one-piece ring or a composite ring assembled of two or more arcuate parts) which is adjacent to and coaxial with the sealing ring and means (e.g., one or more screws or other suitable externally threaded members mating with the two components or with the insert) for urging the second ring axially against the sealing ring so that the latter can be deformed into and maintained in sealing engagement with the two components and with the insert.

The groove includes a first section which is provided in the first portion of the one surface and a second section which is provided in the second portion of the one surface, and the sealing means comprises two rope-like sealing members, one for each of the two sections of the groove and each having an end portion in sealing engagement with the sealing ring. To this end, the sealing ring can have two external recesses which can be disposed diametrically opposite each other, and each such recess sealingly receives the end portion of a sealing member.

In accordance with a presently preferred embodiment, the sealing ring has a polygonal (preferably a square or rectangular) cross-sectional outline.

The sealing ring and the two components and/or the insert can be provided with complementary portions which form-lockingly confine the second ring to axial movements toward and away from the sealing ring. Alternatively, the biasing means can comprise an internally and/or externally threaded nut which mates with the insert and/or with the two components and can be rotated to thereby move axially toward or away from deforming engagement with the sealing ring. The two components preferably include two mirror symmetrical portions which define the opening and surround the insert and have internal shoulders in contact with the sealing ring so that such shoulders cooperate with the second ring or with the nut to ensure the establishment of a seal between the sealing ring and the two components. At the same time, the deformable sealing ring is preferably caused to expand radially inwardly and to bear against the peripheral surface of the insert.

Another feature of the invention resides in the provision of a composite sealing assembly which can be used in the composite housing of a machine or the like and comprises a deformable sealing ring, a pair of rope-like sealing members having end portions which are in sealing contact with the sealing ring, and means for deforming the sealing ring. As mentioned above, the sealing ring can be formed with recesses for the end portions of the sealing members and such recesses can be disposed at least substantially diametrically opposite each other. The sealing ring is preferably a circumferentially complete (one-piece) ring and the deforming (biasing) means can comprise a second ring which is coaxial with and adjacent to the sealing ring as well as means for urging the second ring axially against the sealing ring. Alternatively, the deforming means can comprise the aforementioned nut which mates with a portion of the housing (e.g., with the aforediscussed components and/or with the aforementioned insert). The latter can surround a shaft which extends from the housing.

The novel features which are considered as characteristic of the invention are set forth in particular in the appended claims. The improved composite housing itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 2 is a smaller-scale sectional view as seen in the direction of arrows from the line II—II of FIG. 1.

DESCRIPTION OF THE PREFERRED EMBODIMENTS

Figure 1:
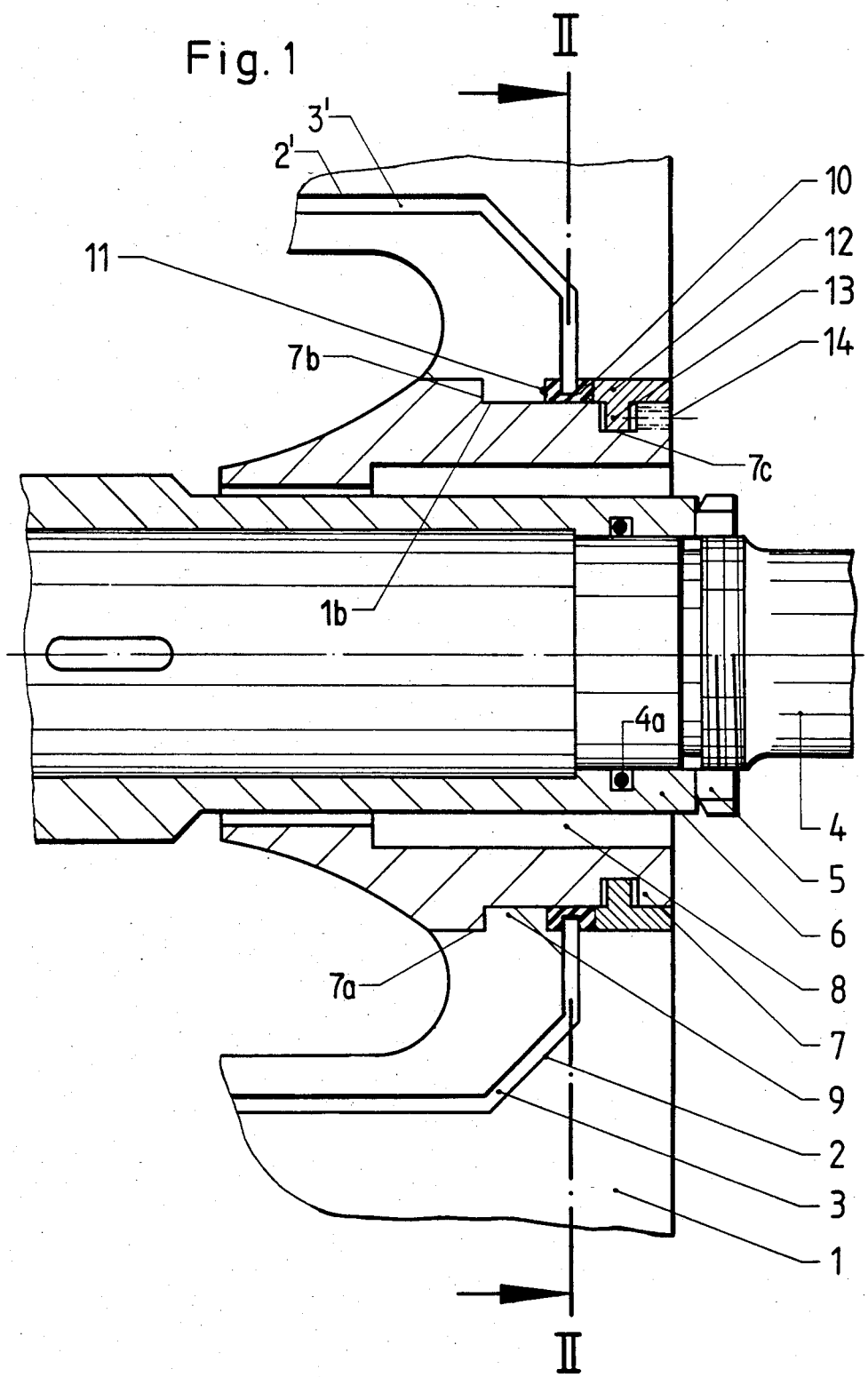
FIG. 1 is a plan view of one component of a composite housing which embodies the invention, the insert, the sealing ring and the ring of the biasing means being shown in section.

The drawing shows a composite housing which can form part of an engine or another prime mover, a large pump, a large valve or any other machine whose casing is assembled of several components which are held together by bolts or in another suitable way. The illustrated housing is assumed to form part of a centrifugal pump and includes two metallic components 1, 1'(e.g., two castings) which have adjoining surfaces 1a, 1a' and together define an opening 1b dividing each of the two surfaces 1a, 1a' into two portions disposed at the opposite sides of an annular insert 7 in the opening 1b. At least one of the surfaces 1a, 1a' is formed with a groove including two sections 2, 2' disposed at the opposite sides of the opening 1b and each of these sections receives a substantially rope-like deformable sealing member 3, 3'. In the illustrated embodiment, the groove 2, 2' is machined into or otherwise formed in the two portions of the surface 1a of the lower component 1 but it is equally possible to provide such groove in the surface 1a' or to provide each of these surfaces with a discrete groove. Irrespective of whether the surface 1a and/or the surface 1a' is grooved, the sealing members 3, 3' are dimensioned and inserted into the respective sections 2, 2' of the groove in such a way that they are maintained in reliable sealing engagement with the components 1 and 1' when the components are held together by a set of bolts or the like so that the surface 1a is closely or immediately adjacent to the surface 1a'. Each of the rope-like sealing members 3, 3' can constitute a deformable tube and can be made of a material similar to that of conventional O-rings.

The annular insert 7 spacedly surrounds a protecting sleeve 6 for a shaft 4 which extends from the housing including the components 1, 1' and the insert 7. The protecting sleeve 6 has an internal shoulder which is urged against the adjacent external shoulder of the shaft 4 by a nut 5 which mates with an externally threaded portion of the shaft. An O-ring 4a is inserted into an internal groove of the sleeve 6 and sealingly contacts the peripheral surface of the shaft 4. The annular space 8 between the external surface of the sleeve 6 and the internal surface of the insert 7 serves to receive a stuffing box or a sliding packing ring (not shown) of conventional design.

The peripheral surface 7a of the insert 7 has a circumferentially complete shoulder 7b for one side face of an internal arcuate stop 9 of the component 1 and a similar internal arcuate stop (not shown) of the component 1'. The other side face of each of the arcuate stops 9 is in contact with the adjacent side 11 of a deformable sealing ring 10 which is a circumferentially complete body having a polygonal (preferably square or rectangular) cross-sectional outline. The sealing ring 10 surrounds the peripheral surface 7a of the insert 7 and its side 11 is biased against the arcuate stops 9 of the components 1, 1' by a second ring 12 in conjunction with means (such as a set of screws 14 which mate with the insert 7) for urging the ring 12 axially toward the internal rings 9. The ring 12 has a circumferentially complete annular projection 13 which extends from its internal surface and is axially movably received in a complementary circumferentially complete groove 7c machined into the peripheral surface 7a of the insert 7 so that the ring 12 has a certain freedom of axial movement toward and away from the sealing ring 10. When the screws 14 are applied, the ring 12 urges the sealing ring 10 into sealing engagement with the stops 9 of the components 1, 1'; at the same time, the ring 10 is caused to expand radially inwardly into desirable sealing engagement with the peripheral surface 7a of the insert 7. The extent of deformation of the sealing ring 10 can be adjusted by the screws 14.

The illustrated ring 12 is assembled of two semicircular parts so as to facilitate insertion of its internal projection 13 into the groove 7c of the insert 7. This ring and the screws 14 can be replaced with a nut (similar to the nut 5) which mates with the insert 7 and/or with the components 1, 1' and is rotatable by a suitable tool so as to move axially into and from deforming engagement with the sealing ring 10. It is also possible to provide the ring 12 with an external projection (in lieu of or in addition to the projection 13) which is received in complementary internal grooves of the components 1 and 1' with requisite freedom of axial movement into and from deforming engagement with the sealing ring 10. The groove 7c of the insert 7 not only confines the ring 12 to axial movements toward and away from the sealing ring 10 but it also facilitates the assembly of the parts of the ring 12 with the insert 7 and sections 1, 1'. The number of screws 14 may vary within a wide range as long as their number suffices to ensure predictable and uniform deformation of the sealing ring 10 into sealing engagement with the components 1, 1' as well as with the insert 7. As a rule, the screws 14 will be uniformly distributed around the shaft 4. It is presently preferred to employ screws whose heads are provided with hexagonal sockets for the working end of a suitable torque transmitting tool.

The end portions 15, 15' of the sealing members 3, 3' are sealingly received in complementary recesses 10a of the sealing ring 10. Such recesses are disposed diametrically opposite each other. The manner of sealingly installing the end portions 15, 15' in the respective recesses can be selected practically at will. For example, the end portions 15 and 15' can be surrounded by a hardenable sealing substance which is introduced into the recesses in requisite quantities to completely surround the end portions and to at least substantially fill the recesses. It is also possible to select the dimensions of the end portions 15, 15' in such a way that each thereof is a press fit in the respective recess of the sealing ring 10.

The improved composite housing is assembled in the following way: The protecting sleeve 6 is slipped onto the shaft 4 and is secured thereto by the nut 5. If both end portions of the shaft 4 extend from the housing including the components 1 and 1', the other end portion of the shaft is also surrounded by a protecting sleeve (not shown) which is surrounded by a second insert (not shown), the latter being surrounded by two additional components 1, 1' (not shown) of the housing. The insert 7 is slipped onto the sleeve 6 and the sealing ring 10 is slipped onto the peripheral surface 7a prior or subsequent to introduction of the end portions 15, 15' of the sealing members 3, 3' into the respective recesses 10a. The two halves of the ring 12 are then placed next to the sealing ring 10 before the parts 4, 6, 7, 10, 12 are lowered into that half of the opening 1b which is defined by the lower component (e.g., by the component 1). The end portions 15, 15' of the sealing members 3, 3' are preferably introduced into the respective recesses 10a shortly before the insert 7 comes to rest on the lower component 1. The component 1' is thereupon lowered onto the component 1 and the two components are secured to each other by bolts or in another suitable way so that the rope-like members 3 and 3' are held in requisite sealing contact with the adjacent portions of the surfaces 1a and 1a'. In the next step, the screws 14 are rotated by a suitable tool to move the ring 12 axially toward and into deforming engagement with the sealing ring 10 whereby the latter bears against the internal stops 9 of the components 1, 1' as well as against the peripheral surface 7a of the insert 7. At the same time, the end portions 15, 15' of the sealing members 3, 3' are in required sealing engagement with the ring 10 to prevent any leakage between the interior and the exterior of the housing in the region surrounding the insert 7. A stuffing box or another suitable sealing device is thereupon introduced into the annular space 8 to establish a seal between the internal surface of the insert 7 and the external surface of the sleeve 6.

An important advantage of the improved sealing assembly including the sealing members 3, 3', the sealing ring 10 and the (biasing) means (such as 12, 14) for deforming the sealing ring is that it allows for substantial shortening of the shaft 4 because the insert 7 can be placed into the opening 1b which is defined by the components 1 and 1' of the housing. Shortening of the shaft 4, in turn, allows for a shortening of the entire machine which embodies the improved composite housing and the sealing assembly therefor. This is important when the machine (e.g., a centrifugal pump) must be installed in a relatively small area. Heretofore, a substantial part of such area had to be left unoccupied in order to afford access to screws and/or other parts which must be manipulated subsequent to installation of the housing in order to ensure the establishment of adequate seals between the discrete components of the housing. In accordance with the present invention, the end portions 15, 15' of the sealing members 3 and 3' are simply bonded to the sealing ring 10 to thus ensure the establishment of a fluidtight seal between the adjoining surfaces 1a, 1a' as well as all the way around the insert 7.

The utilization of a sealing ring having a square, rectangular or other polygonal outline is preferred at this time because such sealing rings can be manufactured at a lower cost and also because all such surfaces of the insert 7 and components 1, 1' which come in contact with the sealing ring can be machined at a reasonable cost. Moreover, it is simple to form recesses 10a in the circumferential surface of a sealing ring having a square or rectangular cross-sectional outline.

The provision of complementary portions on the ring 12 and on the insert 7 and/or components 1, 1' is desirable and advantageous because this reduces the likelihood of misplacement of the ring 12, i.e., the latter remains in a selected position as soon as its projection 13 is received in the groove 7c of the insert 7.

The utilization of biasing means in the form of a ring and screws or analogous means for urging the ring axially against the sealing ring 10 is desirable and advantageous because such biasing means occupies little room. Thus, if the heads of the screws 14 are provided with polygonal sockets for reception of the working ends of suitable tools, the heads can be fully recessed into the outer end face of the insert 7 so that the latter need not project outwardly beyond the exposed (preferably smooth) sides of the components 1 and 1'.

It has been found that the improved sealing assembly ensures the establishment of a highly reliable seal in the critical region where the space around the insert 7 communicates with the gaps between the surfaces 1a, 1a' of the components 1 and 1'.

Centrifugal pumps of the type capable of embodying the sealing assembly of the present invention are shown on page 6 in the brochure entitled "KSB Abroad" which is published by the assignee of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A composite machine housing comprising two neighboring components having adjoining surfaces, at least one of said surfaces having a groove and said components defining an opening; an insert disposed in said opening and having a peripheral surface; a sealing ring surrounding said peripheral surface; sealing means disposed in said groove and sealingly contacting the other of said adjoining surfaces as well as sealing ring; and means for biasing said sealing ring into sealing engagement with said components and with said peripheral surface, said biasing means including a second ring adjacent to said sealing ring and means for urging said second ring axially against said sealing ring.

2. The housing of claim 1, wherein said insert is an annulus.

3. The housing of claim 1, wherein each of said adjoining surfaces includes first and second portions flanking said insert and said groove includes first and second sections respectively provided in the first and second portions of said one surface, said sealing means including first and second sealing members disposed in the respective sections of said groove and sealingly contacting the corresponding portions of said other surface and said sealing ring.

4. The housing of claim 3, wherein said sealing ring is a one-piece ring and said biasing means comprises a composite second ring and means for urging said second ring axially against said sealing ring.

5. The housing of claim 3, wherein said sealing ring has a polygonal cross-sectional outline.

6. The housing of claim 5, wherein said sealing ring has two recesses and said sealing members have end portions sealingly received in the recesses of said sealing ring.

7. The housing of claim 3, wherein said sealing ring has first and second recesses disposed substantially diametrically opposite each other and said sealing members have end portions which are sealingly received in the respective recesses.

8. The housing of claim 1, wherin said biasing means comprises a second ring which is coaxial with and adjacent to said sealing ring, said second ring and at least one of the parts including (a) said insert and (b) said components having complementary portions confining said second ring to axial movements relative to said sealing ring, said biasing means further comprising means for urging said second ring axially against said sealing ring.

9. The housing of claim 8, wherein said urging means comprises at least one externally threaded member meshing with said insert or with one of said components.

10. The housing of claim 1, wherein said biasing means comprises a nut meshing with at least one of the parts including (a) said insert and (b) said components and being rotatable to thereby move axially against or away from said sealing ring.

11. The housing of claim 1, wherein said components include mirror symmetrical portions surrounding said insert and having internal stops in contact with said sealing ring.

12. A composite sealing assembly for use in composite housing of machines and the like, comprising a deformable sealing ring; a pair of sealing members having end portions extending substantially radially from and sealingly contacting said sealing ring, said sealing ring having recesses for the end portions of said sealing members; and means for deforming said sealing ring.

13. The assembly of claim 12, wherein said recesses are disposed substantially diametrically opposite each other.

14. The assembly of claim 12, wherein said sealing ring is a circumferentially complete ring.

15. The assembly of claim 12, wherein said deforming means comprises a second ring coaxial with and adjacent to said sealing ring and means for urging said second ring axially against said sealing ring.

16. The housing of claim 1, wherein said sealing means includes at least one substantially cord-like sealing member.

17. The sealing assembly of claim 12, wherein each of said sealing members is a rope-like sealing member.

18. A composite machine housing comprising two neighboring components having adjoining surfaces, at least one of said surfaces having a groove and said components defining an opening; an insert disposed in said opening and having a peripheral surface, each of said adjoining surfaces including first and second portions flanking said insert and said groove including first and second sections respectively provided in the first and second portions of said one surface; a sealing ring having a polygonal cross-sectional outline, surrounding said peripheral surface and having two recesses; substantially cord-like sealing means disposed in said groove and sealingly contacting the other of said adjoining surfaces as well as said sealing ring, said sealing means including first and second sealing members disposed in the respective sections of said groove and sealingly contacting the corresponding portions of said other surface and said sealing ring, said sealing members having end portions sealingly received in the recesses of said sealing ring; and means for biasing said sealing ring into sealing engagement with said components and with said peripheral surface.

19. A composite machine housing comprising two neighboring components having adjoining surfaces, at least one of said surfaces having a groove and said components defining an opening; an insert disposed in said opening and having a peripheral surface, each of said adjoining surfaces including first and second portions flanking said insert and said groove including first and second sections respectively provided in the first and second portions of said one surface; a sealing ring surrounding said peripheral surface and having first and second recesses disposed substantially diametrically opposite each other; substantially cord-like sealing means disposed in said groove and sealingly contacting the other of said adjoining surfaces as well as said sealing ring, said sealing means including first and second sealing members disposed in the respective sections of said groove and sealingly contacting the corresponding portions of said other surface and said sealing ring, said sealing members having end portions which are sealingly received in the respective recesses; and means for biasing said sealing ring into sealing engagement with said components and with said peripheral surface.

* * * * *